(12) United States Patent
Ide et al.

(10) Patent No.: US 9,664,859 B2
(45) Date of Patent: May 30, 2017

(54) OPTICAL FIBER CONNECTOR, OPTICAL MODULE, AND FABRICATING METHOD THEREOF

(71) Applicant: CITIZEN HOLDINGS CO., LTD., Tokyo (JP)

(72) Inventors: Masafumi Ide, Saitama (JP); Kaoru Yoda, Nagano (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 14/810,124

(22) Filed: Jul. 27, 2015

(65) Prior Publication Data
US 2016/0025935 A1 Jan. 28, 2016

(30) Foreign Application Priority Data
Jul. 28, 2014 (JP) ................................ 2014-153241

(51) Int. Cl.
*G02B 3/00* (2006.01)
*G02B 6/38* (2006.01)
(Continued)

(52) U.S. Cl.
CPC ......... *G02B 6/3801* (2013.01); *G02B 3/0087* (2013.01); *G02B 6/02042* (2013.01); *G02B 6/32* (2013.01); *G02B 6/3608* (2013.01)

(58) Field of Classification Search
CPC ...... G02B 6/32; G02B 6/3608; G02B 6/3616; G02B 6/3628; G02B 6/3632;
(Continued)

(56) References Cited

U.S. PATENT DOCUMENTS 8,923,668 B2 * 12/2014 Hayashi ............... G01M 11/088
385/31
2010/0331626 A1 12/2010 Shimotsu
2012/0321253 A1 * 12/2012 Shimakawa ............ B23P 11/00
385/71

FOREIGN PATENT DOCUMENTS

JP S57-210313 A 12/1982
JP S61-138205 A 6/1986
(Continued)

OTHER PUBLICATIONS

Machine English translation of JP 2014-178628A.*
(Continued)

*Primary Examiner* — John M Bedtelyon (57) ABSTRACT

Provided is a downsized connector for a multicore fiber and a plurality of single-mode fibers which can simplify the core alignment process between the fibers. The optical fiber connector includes a mount substrate, a multicore fiber including a plurality of cores arrayed in the same plane, a first sub-substrate configured to fix an end part of the multicore fiber, and to be bonded on the mount substrate, a plurality of single-mode fibers including at least the same number of fibers as the plurality of cores of the multicore fiber, and a second sub-substrate configured to fix end parts of the plurality of single-mode fibers, and to be bonded on the mount substrate. A relative position between the first sub-substrate and the second sub-substrate is determined, so that the plurality of cores of the multicore fiber and the plurality of single-mode fibers of the same number as the plurality of cores are optically coupled, respectively.

8 Claims, 9 Drawing Sheets

(51) Int. Cl.
*G02B 6/36* (2006.01)
*G02B 6/32* (2006.01)
*G02B 6/02* (2006.01)

(58) Field of Classification Search
CPC .... G02B 6/3636; G02B 6/364; G02B 6/3644;
G02B 6/3648; G02B 6/3668; G02B
6/02042; G02B 3/0087; G02B 6/38;
G02B 6/3801
See application file for complete search history.

(56) References Cited

FOREIGN PATENT DOCUMENTS

| | | |
|---|---|---|
| JP | S62-118310 A | 5/1987 |
| JP | S63-0253312 A | 10/1988 |
| JP | S64-024209 A | 1/1989 |
| JP | H10-073732 A | 3/1998 |
| JP | 2010-286718 A | 12/2010 |
| JP | 2011-008013 A | 1/2011 |
| JP | 2014-178628 A | 9/2014 |
| WO | 2014/038514 A1 | 3/2014 |

OTHER PUBLICATIONS

M. Tanaka et al., "Development of Multi-core Fiber and Fan-in/Fan-out Device", Mitsubishi cable Industries, Ltd. R&D Review, No. 109, Sep. 2012.
O. Shimakawa et al., "Connector-type Fan-Out Devices for Multi-Core Fiber", SEI Technical Review, No. 183, Jul. 2013.

\* cited by examiner

FIG. 8 under OPTICAL FIBER CONNECTOR, OPTICAL
MODULE, AND FABRICATING METHOD
THEREOF

CROSS REFERENCE TO RELATED
APPLICATION

This application is a new U.S. patent application that claims benefit of JP 2014-153241, filed on Jul. 28, 2014. The entire contents of JP 2014-153241 are hereby incorporated by reference.

TECHNICAL FIELD

The present invention relates to an optical fiber connector, an optical module and a fabricating method thereof.

BACKGROUND

As a technique for optically connecting a multicore fiber and a single-mode fiber, a scheme for using a lens system in which a plurality of lenses are arranged between the fibers and a scheme for using a connector are known. For example, International Publication WO2014/038514 (Patent Literature 1) describes an optical connector that has a first lens which an emission light from a plurality of cores included in a multicore fiber enters, a second lens which the emission light from the first lens enters, and a lens array which the emission light from the second lens enters, wherein the emission light from constituent lenses included in the lens array enters corresponding single-mode fibers, and thus the multicore fiber and the single-mode fibers are optically connected. Further, "Development of Multicore Fiber and Fan-in/Fan-out Device" by Masatoshi Tanaka, Masayoshi Hachiwaka, and Hirokazu Taniguchi; Mitsubishi cable Industries, Ltd. R&D Review, No. 109, September 2012 (Non-Patent Literature 1), and "Connector-type Fan-Out Devices for Multi-Core Fiber" by Osamu Shimakawa, Hajime Arao, Manabu Shiozaki, Tomomi Sano and Akira Inoue, SEI Technical Review, No. 183, July 2013 (Non-Patent Literature 2) describe fan-out function components that separate the multicore fiber pin provided with a plurality of cores at a center into a plurality of single-core fibers.

SUMMARY

However, in a space optical system using a plurality of lenses as in Patent Literature 1, an alignment (core alignment) between the respective lenses is required, and therefore there are many points to be aligned, and fabrication of an optical fiber connector is complex. For example, in order to use as a multiplexer of red (R), green (G), and blue (B) laser light, further downsizing of the optical fiber connector is required, but there is a limit on the downsizing in the lens system as in Patent Literature 1. In a connection scheme by the connectors as in Non-Patent Literatures 1, 2, it is necessary to execute special treatment that is not suitable for mass production on the single-mode fibers, and thus it is difficult to lower fabrication cost of the optical fiber connector.

Thus, an object of the present invention is to provide a downsized connector for a multicore fiber and a plurality of single-mode fibers which can simplify the core alignment process between the fibers, compared with the case without this configuration.

An optical fiber connector includes a mount substrate, a multicore fiber including a plurality of cores arrayed in the same plane, a first sub-substrate configured to fix an end part of the multicore fiber, and to be bonded on the mount substrate, a plurality of single-mode fibers including at least the same number of fibers as the plurality of cores of the multicore fiber, and a second sub-substrate configured to fix end parts of the plurality of single-mode fibers, and to be bonded on the mount substrate, wherein a relative position between the first sub-substrate and the second sub-substrate is determined, so that the plurality of cores of the multicore fiber and the plurality of single-mode fibers of the same number as the plurality of cores are optically coupled, respectively.

Preferably, in the above optical fiber connector, gradient index lenses are respectively provided at the end part of the multicore fiber and at the end parts of the plurality of single-mode fiber.

Preferably, in the above optical fiber connector, the second sub-substrate fixes the end parts of the plurality of single-mode fibers, so that end parts of two adjacent single-mode fibers form an angle corresponding to a spread angle of a plurality of beams emitted from the plurality of cores of the multicore fiber.

Preferably, in the above optical fiber connector, the plurality of single-mode fibers are three single-mode fibers that guide red, green and blue laser light, respectively, and the plurality of cores of the multicore fiber are three cores which guide the red, green and blue laser light, respectively.

Preferably, in the above optical fiber connector, the first sub-substrate fixes the end part of the multicore fiber, so that the plurality of cores is arrayed in parallel to a top surface of the mount substrate.

An optical module includes a mount substrate, a multicore fiber including a plurality of cores arrayed in the same plane, a first sub-substrate configured to fix an end part of the multicore fiber, and to be bonded on the mount substrate, a plurality of single-mode fibers including at least the same number of fibers as the plurality of cores of the multicore fiber, a second sub-substrate configured to fix end parts of the plurality of single-mode fibers, and to be bonded on the mount substrate, and a light source unit configured to emit red, green and blue laser light guided by the multicore fiber and the plurality of single-mode fibers, wherein a relative position between the first sub-substrate and the second sub-substrate is determined, so that the plurality of cores of the multicore fiber and the plurality of single-mode fibers of the same number as the plurality of cores are optically coupled, respectively.

A method for fabricating an optical fiber connector includes the steps of fixing to a first sub-substrate an end part of a multicore fiber including a plurality of cores arrayed in the same plane, fixing to a second sub-substrate end parts of a plurality of single-mode fibers including at least the same number of fibers as the plurality of cores of the multicore fiber, arranging the first sub-substrate and the second sub-substrate on a mount substrate, determining a relative position between the first sub-substrate and the second sub-substrate, so that the plurality of cores of the multicore fiber and the plurality of single-mode fibers of the same number as the plurality of cores are optically coupled, respectively, and bonding on the mount substrate, the first sub-substrate and the second sub-substrate, the relative position of which is determined.

Preferably, in the above method, the relative position of the first sub-substrate and the second sub-substrate is determined based on an optical coupling efficiency between one fiber of the plurality of single-mode fibers and a core of the multicore fiber corresponding to the one fiber.

The above optical fiber connector, optical module and fabricating method provide a downsized connector for a multicore fiber and a plurality of single-mode fibers which can simplify the core alignment process between the fibers, compared with the case without this configuration.

BRIEF DESCRIPTION OF THE DRAWINGS

Other features and advantages of the present invention will be apparent from the ensuing description, taken in conjunction with the accompanying drawings, in which.

DESCRIPTION

Hereinafter, with reference to the drawings, an optical fiber connector and a fabricating method thereof, and an optical module using the optical fiber connector will be described. It should be noted that the technical scope of the present invention is not limited to embodiments of the invention, but covers the invention described in the claims and its equivalent.

Figure 1:
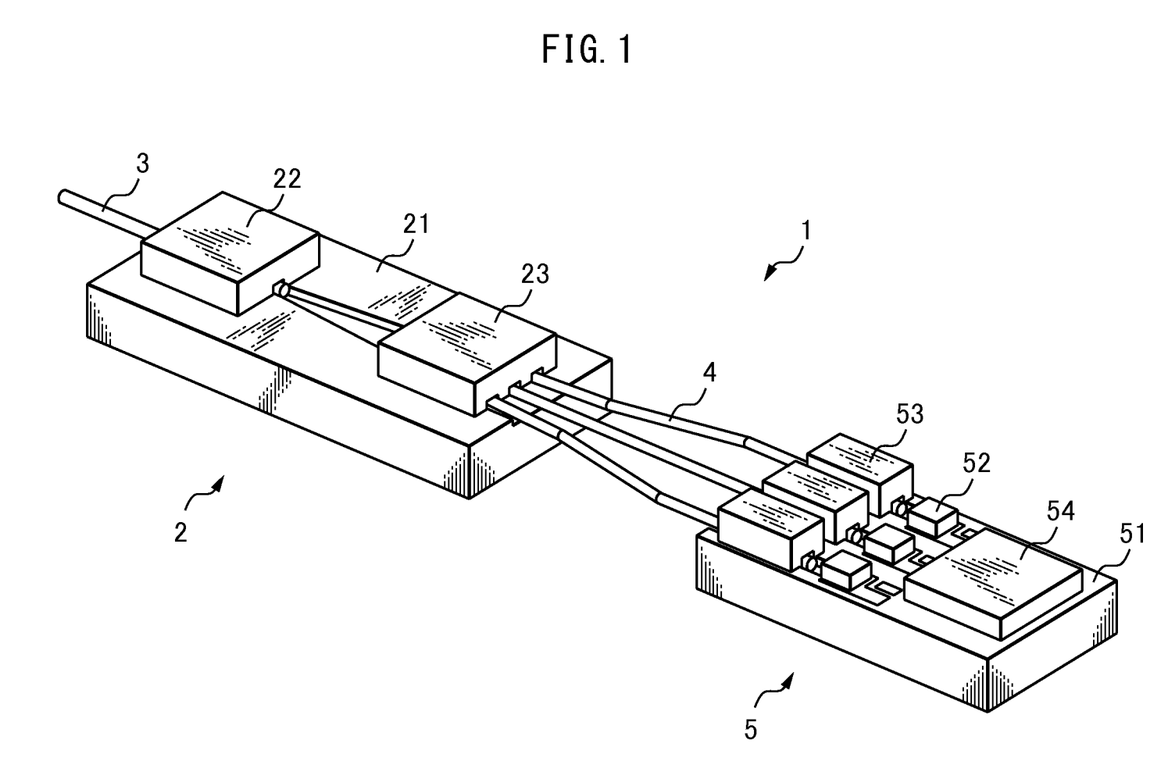
FIG. 1 is a perspective view of an optical module 1.
Figure 2A:
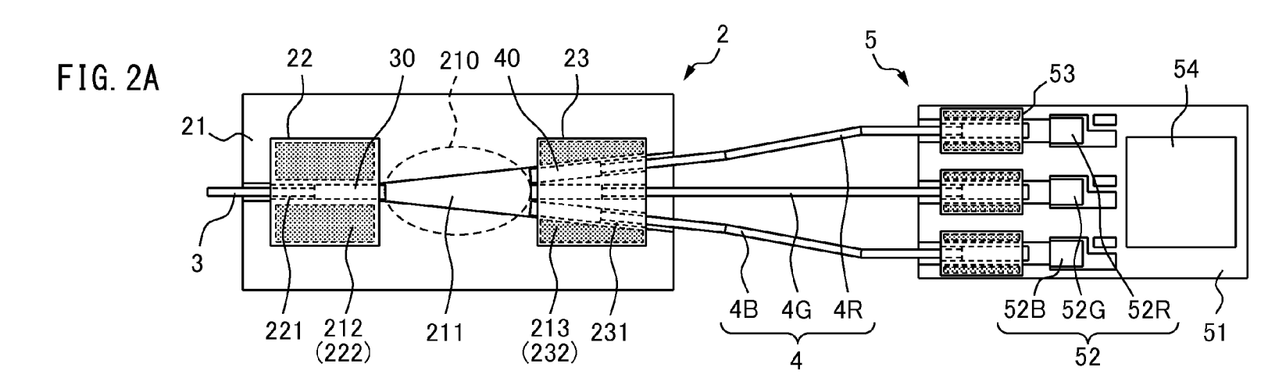
FIGS. 2A to 2C are a top view and a side view of the optical module 1, and a rear view of a sub-substrate 23, respectively.
Figure 2B:
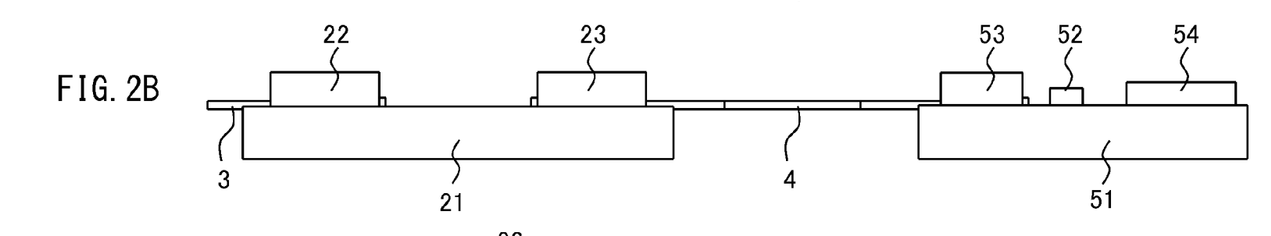
Figure 2C:
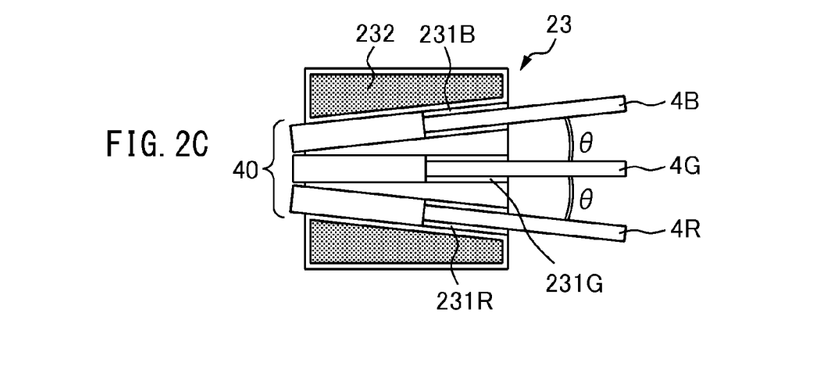

FIG. 1 is a perspective view of an optical module 1. FIG. 2A to FIG. 2C are a top view and a side view of the optical module 1, and a rear view of a sub-substrate 23, respectively. The optical module 1 is a multicore fiber module having a color combiner 2 and a light source unit 5, which are discrete. The optical module 1 is used for a light source of a laser projector or a laser scanner, for example.

The color combiner 2, which is one example of an optical fiber connector, optically connects a multicore fiber 3 and three single-mode fibers (single-core fiber) 4. The single-mode fibers 4 guide respective color laser beams of red color (R), green color (G) and blue color (B) emitted by the light source unit 5, and emits the respective color laser beams from an emission end part connected to one end of the color combiner 2. The respective color laser beams enter an incident end part of the multicore fiber 3 connected to the other end of the color combiner 2. Hereinbelow, the single-mode fibers 4 that guide respective color laser beams of RGB are also referred to as "R fiber 4R", "G fiber 4G", "B fiber 4B".

The color combiner 2 has a mount substrate 21, a sub-substrate 22, and a sub-substrate 23. In FIG. 2A, the insides of respective sub-substrates such as the sub-substrates 22, 23 are also illustrated in broken lines.

As illustrated in FIG. 2A, in the incident end part of the multicore fiber 3 and the emission end parts of the three single-mode fibers 4, GI (graded index) lenses 30, 40 are provided as an example of gradient index lens, respectively. In space 210 between the emission end parts (end parts of the GI lenses 40) of the single-mode fibers 4 and the incident end part (end part of the GI lens 30) of the multicore fiber 3, the color combiner 2 directly optically connects the fibers without intervening lenses such as collimator lenses or condenser lenses. Further, the color combiner 2 also acts as a multiplexer that multiplexes respective color laser beams of RGB emitted from the three single-mode fibers 4. The multicore fiber 3 guides respective color laser beams multiplexed by the color combiner 2 and entering the incident end part by using different cores, and the respective color laser beams are projected on a screen, for example, via a projection optical system.

The mount substrate 21 is a substrate made of silicon having a size with each side of about 2 to 5 mm, and also called a Si platform. On the mount substrate 21, the multicore fiber 3 and the single-mode fibers 4 provided with the GI lenses 30, 40 are mounted by using the two sub-substrates 22, 23, respectively, the relative position of which has been adjusted so that the fibers are optically coupled efficiently. As illustrated in FIG. 1 and FIG. 2A, on sections where the sub-substrates 22, 23 are bonded on the top surface of the mount substrate 21, and a section between the sub-substrate 22 and the sub-substrate 23, a groove 211 is formed for adjusting the heights of the multicore fiber 3 and the single-mode fibers 4, and forming a clearance that allows a collimate light from the GI lenses 40 to be guided in the space. The depth of the groove 211 is constant on the mount substrate 21. Further, the width of the groove 211 has the same size as that of the multicore fiber 3 in the section where the sub-substrate 22 is bonded, but become wider as it goes from the end of the GI lens 30 side toward the sub-substrate 23 side.

The sub-substrate 22 is an inverted-U-shaped substrate where a groove 221 for housing the incident end part of the multicore fiber 3 is formed in the center by dry etching. For example, a silicon substrate or a glass substrate is used for the sub-substrate 22. The sub-substrate 22 is one example of the first sub-substrate, and fixes the incident end part of the multicore fiber 3 onto the mount substrate 21.

The sub-substrate 23 is a substrate where three grooves 231 for housing the emission end parts of the single-mode fibers 4 respectively are formed in the center by dry etching. For example, a silicon substrate or a glass substrate is used for the sub-substrate 23. The sub-substrate 23 is one example of a second sub-substrate, and fixes the emission end parts of the single-mode fibers 4 onto the mount substrate 21 so that the end parts of the adjacent single-mode fibers 4 form a predetermined angle.

As illustrated in FIG. 2C, the three grooves 231 are constituted by the groove 231G that passes through the center of the bottom surface of the sub-substrate 23, and the grooves 231R, 231B that are symmetrical each other with respect to the groove 231G. The grooves 231R, 231G, 231B house the emission end parts of the R fiber 4R, the G fiber 4G, and the B fiber 4B, respectively. The grooves 231R, 231B are obliquely formed relative to the groove 231G so that they are close to the center where the groove 231G is provided, at the left end of the sub-substrate 23 illustrated in FIG. 2C, and that they go away from the groove 231G as they go to the right end of the sub-substrate 23. An angle θ formed between the grooves 231R and 231G and an angle θ formed between the grooves 231G and 231B are the same, and the depths and widths of the grooves 231R, 231G, 231B each are the same.

In the sections where the sub-substrates 22, 23 are bonded on the top surface of the mount substrate 21, micro-bumps for performing surface-activated bonding of the mount substrate 21 to the sub-substrates 22, 23 are formed on both sides of the grooves 221, 231, respectively. In FIG. 2A, regions where the micro-bumps are formed are represented by symbols 212, 213. The micro-bumps are formed of metallic material such as gold (Au), and are a large number of minute protrusions with a size of a few microns.

In addition, the sub-substrates 22, 23 have metal films 222, 232 for surface-activated bonding formed, for example, from gold (Au), on the surfaces in contact with the mount substrate 21 (undersurfaces in the illustration), respectively. FIG. 2A displays the metal films 222, 232 overlaid on the regions 212, 213 where the micro-bumps are formed. The micro-bumps on the top surface of the mount substrate 21 and the metal films on the undersurfaces of the sub-substrates 22, 23 are cleaned by Ar (argon) plasma prior to bonding, and thereby respective surfaces are activated. When the sub-substrates 22, 23 are placed on the mount substrate 21, and a load is applied to each of the sub-substrates 22, 23 at normal temperature, the micro-bumps and the metal films come into contact with each other, so that the micro-bumps are crushed. As a result, the metal atoms of the micro-bumps and the metal atoms of the metal films are mutually diffused one to another. This allows the sub-substrates 22, 23 to be bonded via surface-activated bonding on the top surface of the mount substrate 21, by using coagulation among the atoms.

Based on the fact that the surface-activated bonding does not require heating, positional deviations of respective elements by residual stress due to difference in thermal expansion coefficients do not easily occur, and bonded assembly can be positioned and mounted with high precision. Further, by using, for example, a stopper layer made of silicon on an insulator, the depths of the grooves 221, 231 are strictly controlled so that respective cores of the multicore fiber 3 and the single-mode fibers 4 are positioned at a predefined height relative to the top surface of the mount substrate 21 when the sub-substrates 22, 23 are bonded on the mount substrate 21. This allows the multicore fiber 3 and the single-mode fibers 4 to be strictly aligned in the vertical direction.

Figure 3:
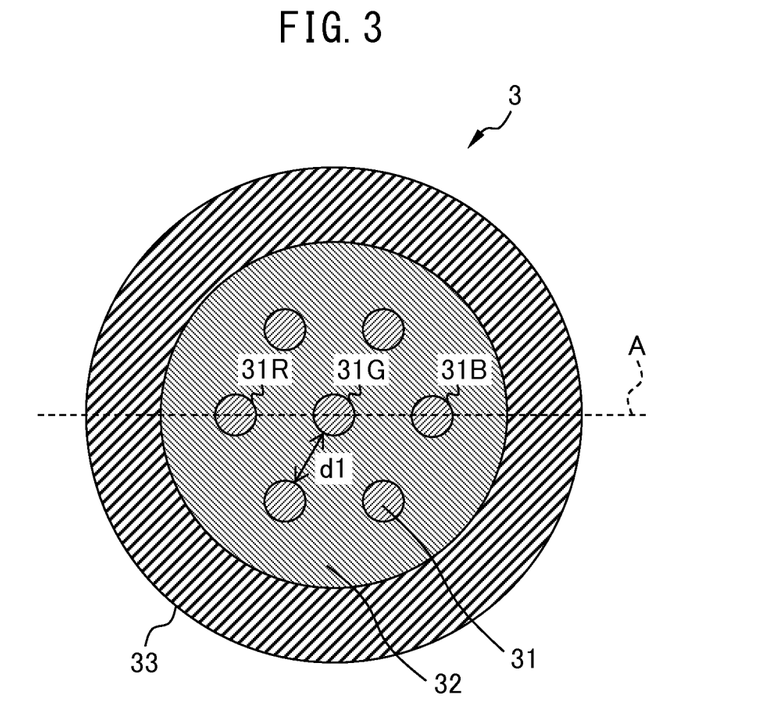
FIG. 3 is a cross-sectional view of the multicore fiber 3.

FIG. 3 is a cross-sectional view of the multicore fiber 3. In FIG. 3, the cross-section perpendicular to the longitudinal direction of the multicore fiber 3 is schematically illustrated. The multicore fiber 3 has, as one example, seven cores 31, and a cladding 32 that covers the circumferences of the respective cores 31, and a resin coating 33 that covers the cladding 32. For example, the diameter of the respective cores 31 is about several microns, and the spacing d1 of adjacent cores 31 ranges from about 20 to 30 μm, and the diameter of the cladding 32 is about 80 μm.

In the multicore fiber 3, only the three cores 31 arranged horizontally relative to the top surface of the mount substrate 21, of the seven cores 31 are used, and the three cores 31 are optically coupled to the three single-mode fibers 4, respectively. These three cores 31 are cores that are on a broken line "A" in FIG. 3. In other words, the multicore fiber 3 guides each of color laser beams of RGB by using the three cores 31 arrayed in the same plane, respectively. These three cores 31 are hereinafter also referred to as "cores 31R, 31G, 31B", respectively. The incident end part of the multicore fiber 3 is fixed by the sub-substrate 22, so that the three cores 31R, 31G, 31B on the broken line "A" are arrayed in parallel to the top surface of the mount substrate 21.

Figure 4:
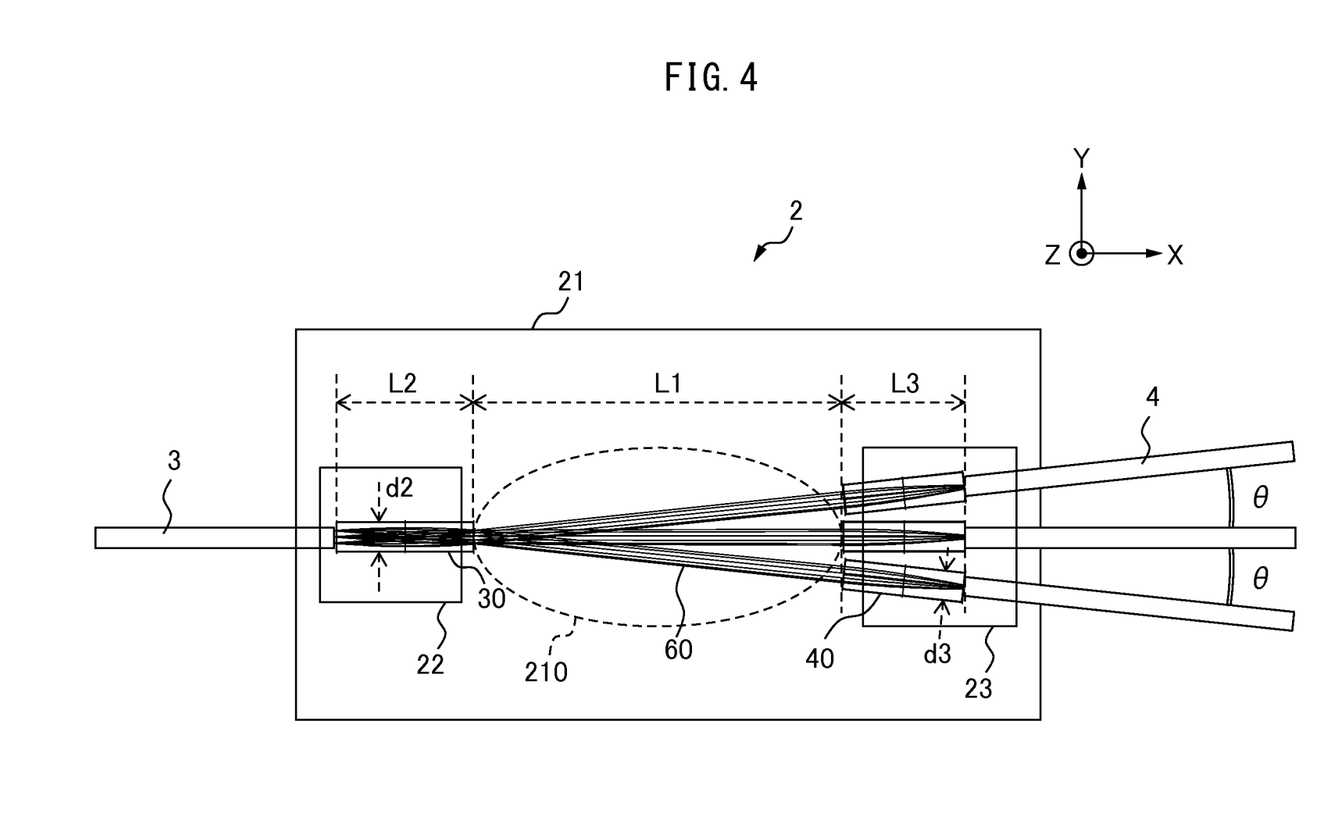
FIG. 4 is a view for explaining the structure of the color combiner 2.

FIG. 4 is a view for explaining the structure of the color combiner 2. In FIG. 4, a top view of the color combiner 2 is illustrated. As illustrated in FIG. 4, x-axis, and y-axis are defined to be in the plane of the mount substrate 21, and z-axis is defined to be in a direction perpendicular to the plane of the mount substrate 21.

As described above, the GI lenses 30, 40 are provided at the incident end part of the multicore fiber 3 and the emission end parts of the single-mode fibers 4 fixed by the color combiner 2, respectively. As the multi-mode fibers for the GI lenses 30, 40, fibers with NA (numerical aperture) of relatively high value such as 0.44 are used. The spacing L1 between the tip end of the GI lens 30 and the tip ends of the GI lenses 40 is, for example, about 1400 μm. Further, for example, the diameters d2, d3 of the GI lenses 30, 40 are about 125 μm, and the lengths L2, L3 are about 600 μm. The lengths of the GI lenses 30, 40 need to be optimized based on distribution of refractive indexes or magnitude of refractive indexes of the GI lenses. The length of the GI lenses 40 is selected, so that the cores of the respective single-mode fibers 4 are coupled into the GI lenses 40, and that the beams emitted to the space 210 are collimated. Further, the length of the GI lens 30 is selected, so that the collimated lights are condensed/coupled with high efficiency to the respective cores 31 of the multicore fiber 3. In the case of the optical fiber connector based on a lens system, at least a size of about 20 mm square is necessary, but it is possible to miniaturize the color combiner 2 as a whole to a size of about 2 to 3 mm square.

In FIG. 4, three beams 60 optically coupled between the multicore fiber 3 and the single-mode fibers 4 are also schematically illustrated. Description will be made assuming that the three beams 60 have been emitted from the ends of the three cores 31R, 31G, 31B of the multicore fibers 3 because the same is true even if either the multicore fiber 3 or the single-mode fibers 4 is/are the emitting side. When the length L2 of the GI lens 30 has been adjusted, the respective beams 60 are collimated by the GI lens 30, and are emitted from the GI lens 30 as substantially parallel light. Further, due to the fact that the three cores 31R, 31G, 31B of the multicore fiber 3 emitting the respective beams 60 are displaced in the y-direction, the beams 60 from the cores 31R, 31B at both ends advance in oblique directions relative to the beam 60 from the central core 31G, after emitted from the GI lens 30. Since the three beams 60 each are collimated, if the same lenses as the GI lens 30 are arranged as the GI lenses 40 on the extended lines of the respective beams 60, each of the beams 60 is focused at one point by the cores of the respective single-mode fibers 4, after passing through the GI lenses 40.

If the color combiner 2 is configured by the above-described dimension/specification, both angles θ between the GI lenses 40 at both ends and the GI lens 40 in the center are optimally approximately 6°. The angle θ is defined, so that the spacing of the respective beams 60 at the ends of the GI lenses 40 is greater than the smallest core pitch of adjacent single-mode fibers 4 determined by the cladding diameters of the single-mode fibers 4 and the diameters of the GI lenses 40. Further, the angle θ is determined in consideration of the collimate distance (spacing L1) of the space between the multicore fiber 3 and the single-mode fibers 4 as well. The optimum values of the angles θ differ depending on the core spacing of the multicore fiber 3 or specification of the GI lens 30 used for optical coupling. For example, in the color combiner 2, as the GI lenses 30, 40, multimode fibers having a relatively large NA of 0.44 are used, and the core spacing is set at about 23 μm. At this time, three collimate lights entering the GI lens 30 from the space 210 at different angles are coupled to positions of three different cores 31 of the multicore fiber 3, respectively, because they are subjected to an angle/position transformation by action of the GI lens 30.

When the angles between the three GI lenses 40 are deviated from θ, the respective beams 60 do not converge to the core positions of fibers on the incident side. As a result, the optical coupling efficiency is rapidly lowered. In other words, in this optical system, the angular error has a significant effect on the optical coupling efficiency between fibers. On the other hand, with respect to deviation associated with parallel translation in x-, y-directions, since space beams are collimated, the tolerance of positional deviations can be relatively large. However, in order to reduce the angle deviations, at the time of fabrication of the sub-substrate 23, orientations of the respective grooves 231 are controlled by dry etching with a high precision of sub-micron order, and thereby it is possible to provide a structure in which the angles θ are maintained with high precision.

From the above, in the color combiner 2, the angle between the grooves 231R and 231G of the sub-substrate 23 and the angle between the grooves 231G and 231B are both set to satisfy θ=6°. The angle θ has a measure corresponding to a spreading angle of the beams 60 emitted from the three cores 31R, 31G, 31B of the multicore fiber 3. The respective single-mode fibers 4 are fixed to the sub-substrate 23, so that the end parts of the respective GI lenses 40 on the multicore fiber 3 side are placed on the same circumference.

This will enable the three single-mode fibers 4 to move together with the sub-substrate 23, while the angles formed between the GI lenses 40 are kept constant with high precision. Therefore, for example, if the G fiber 4G located in the center among the single-mode fibers 4 is aligned relative to the corresponding core 31G in the center of the multicore fiber 3, the remaining R fiber 4R and B fiber 4B will be automatically aligned. Thus, in the color combiner 2, by active alignment of the G fiber 4G relative to the corresponding core 31G in the center of the multicore fiber 3, a relative position of the sub-substrates 22, 23 is determined based on the optical coupling efficiencies of the fibers. In this manner, the single-mode fibers 4 and the corresponding cores 31R, 31G, 31B of the multicore fiber 3 are optically coupled, respectively.

In the color combiner 2, by employing a Si-platform-type device using GI lenses, a degree of freedom of alignment can be reduced. In the case of the optical fiber connector by a space optical system using a plurality of lenses, there are also degrees of freedom of rotation in addition to degrees of freedom of x-, y-, z-directions. However, in the color combiner 2, since the top surface of the mount substrate 21 is a reference plane, the degrees of freedom of rotation and a degree of freedom of z-direction will disappear. Therefore, in an alignment process of the color combiner 2, it is only necessary to perform alignment in only x-, y-directions.

Further, in the color combiner 2, as described above, since the respective beams 60 are collimated in the space 210 between the multicore fiber 3 and the single-mode fibers 4, an allowable error (tolerance) with respect to position deviation is relatively large as for x-, y-directions. In other words, because the respective beams 60 are nearly parallel lights, fluctuation of the optical coupling efficiency is small, as for the x-direction, even if a relative position of the respective fibers (the GI lenses 30, 40) is slightly deviated. Further, since the respective beams 60 spread in the y-direction, fluctuation of the optical coupling efficiency is small in the y-direction as well, even if a relative position of the respective fibers (the GI lenses 30, 40) is slightly deviated, unlike the case of aligning a condensed beam. Consequently, it is possible to easily fabricate a flat-type optical fiber connector by using the Si platform.

Figure 5:
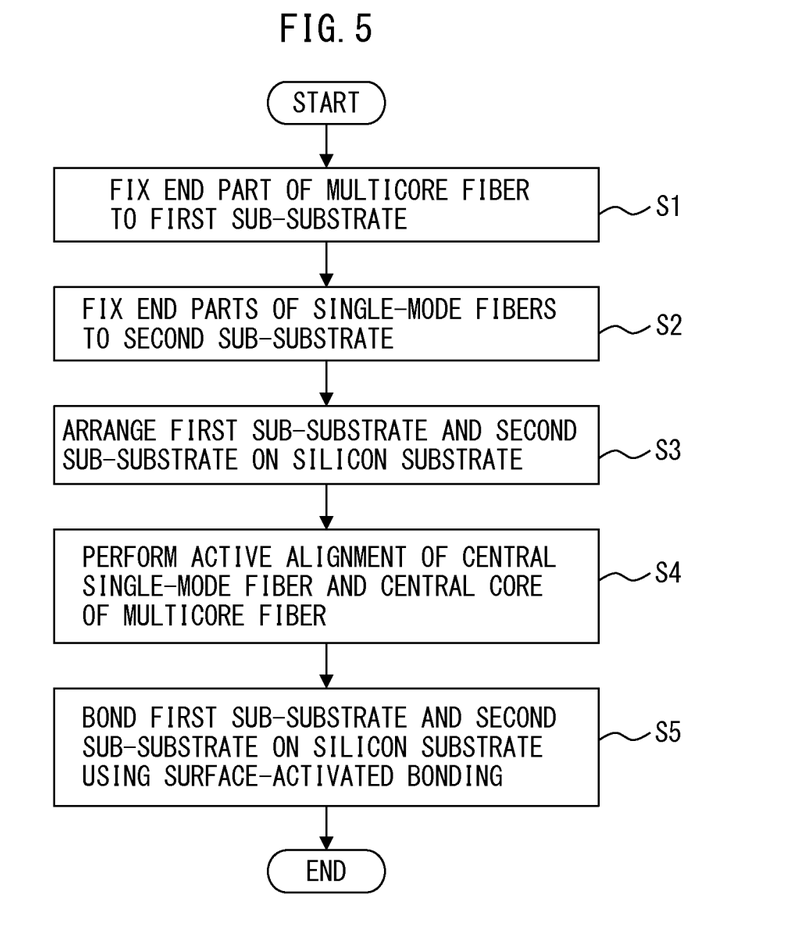
FIG. 5 is a flow diagram illustrating an example of fabricating process of the color combiner 2.

FIG. 5 is a flow diagram illustrating an example of fabricating process of the color combiner 2.

First, the multicore fiber 3 for use in visible light to which a high NA GI lens (collimator) 30 is connected in advance at the tip end thereof is prepared, and the sub-substrate 22 (the first sub-substrate) on which the groove 221 for fixing the multicore fiber 3 is formed in advance is prepared. Similarly, the three single-mode fibers 4 for use in visible light to which high NA GI lenses (collimators) 40 are connected in advance at the tip ends thereof are prepared, and the sub-substrate 23 (the second sub-substrate) on which the grooves 231 for fixing the single-mode fibers 4 are formed in advance is prepared. In the sub-substrate 23, as the grooves 231, the three grooves 231R, 231G, 231B are in advance formed that are close to the center at one end, and form the angles between each of the adjacent grooves which satisfy θ=6°.

Then, the end of the multicore fiber 3 with the GI lens 30 is fixed to the groove 221 of the sub-substrate 22 (step S1). Further, the end parts of the three single-mode fibers 4 with the GI lenses 40 are fixed to the grooves 231 of the sub-substrate 23, respectively (step S2). Then, the sub-substrate 22 and the sub-substrate 23 are arranged on the mount substrate 21 (step S3).

Subsequently, active alignment is performed between the G fiber 4G that is located in the center of the three single-mode fibers 4 and the core 31G in the center of the multicore fiber 3 corresponding to the G fiber 4G, and thus the relative position of the sub-substrate 22 and the sub-substrate 23 is defined (step S4). At this time, for example, the sub-substrate 22 is fixed onto the mount substrate 21, and the position of the sub-substrate 23 is adjusted based on the optical coupling efficiency between the core 31G in the center of the multicore fiber 3 and the G fiber 4G, using an aligning device (not illustrated) having a control unit, a photo-detector and a movement mechanism. Specifically, for example, the light source unit 5 is driven to emit the laser light from the G fiber 4G, and the control unit of the aligning device monitors an output voltage depending on the intensity of the laser light coupled to the core 31G in the center of the multicore fiber 3, by using the photo-detector such as a photodiode. Then, the control unit of the aligning device determines the position of the sub-substrate 23 when the output voltage of the photo-detector becomes maximum, while finely adjusting the position of the sub-substrate 23 in the x-, y-directions in a sub-micron order, using the movement mechanism. Contrary to the above, the sub-substrate 23 may be fixed in advance onto the mount substrate 21, and the position of the sub-substrate 22 may be adjusted.

Finally, a load is applied to the sub-substrates 22, 23 the relative position of which has been determined, and thereby these sub-substrates are bonded on the mount substrate 21, by the surface-activated bonding (step S5). As described above, the fabricating process of the color combiner 2 is completed.

The light source unit 5 will be described with reference to FIG. 1, FIG. 2A, and FIG. 2B again. The light source unit 5 includes a mount substrate 51, laser elements 52, sub-substrates 53, and a driver IC 54. The light source unit 5 emits respective color laser beams of red color (R), green color (G), and blue color (B) guided by the three single-mode fibers 4 and the multicore fiber 3.

The mount substrate 51 is a substrate made of silicon having the laser elements 52, the sub-substrates 53, and the driver IC 54 mounted on its top surface. The mount substrate 51 is provided with silicon through-hole electrodes that penetrate from the top surface to the bottom surface, and wiring of respective mounted elements is routed to the back surface of the mount substrate 51 via the through-hole electrodes. The mount substrate 51 is loaded on a circuit substrate (not illustrated), and an electric signal is supplied from the circuit substrate, via the through-hole electrodes to the laser elements 52 and the driver IC 54.

The laser elements 52 are three laser diodes that emit respective color laser beams of RGB. In FIG. 2A, the three laser elements 52 are distinguished by RGB of luminescence colors, and are represented as "laser elements 52R, 52G, 52B". The laser elements 52 are mounted on the top surface of the mount substrate 51 by surface-activated bonding, after the driver IC 54 is mounted by soldering or the like. Further, the laser elements 52 are mounted face-down (junction-down) so that active layers be located on the mount substrate 51 side, in order to improve the property of heat dissipation and position them with high precision by using the surface of the mount substrate 51 as a reference surface.

The sub-substrates 53 are inverted-U-shaped silicon substrates or glass substrates similar to the sub-substrate 22, and fixes the incident end parts (end parts of the laser element 52 side) of the single-mode fibers 4 where GI lenses for convergence are provided at their tip ends. The GI lenses for convergence can be omitted, but in the case of direct coupling (butt coupling), since end faces of the single-mode fibers 4 and end faces of the laser elements 52 need to be brought into a close proximity in order, it is desirable to provide space by using the GI lenses and widen the tolerance value of alignment. On the light source unit 5, the three sub-substrates 53 that correspond to the three respective single-mode fibers 4 are provided.

Active alignment is performed even between the single-mode fibers 4 and the corresponding laser elements 52, independently of the color combiner 2. At this time, the positions of the sub-substrates 53 on the mount substrate 51 are adjusted individually, based on the light intensity coupled to the corresponding single-mode fibers 4, for each of the laser elements 52R, 52G, 52B. Then, the respective sub-substrates 53 are bonded on the top surface of the mount substrate 51 by the surface-activated bonding at positions determined by the active alignment.

The driver IC 54 is a mechanism that drives the laser elements 52, and acts as a control unit of the light source unit 5. It is preferable that the driver IC 54 have a digital interface mounted, and it is more preferable if the driver IC includes a core portion such as CPU and memory as the control unit. The driver IC 54 is mounted by soldering on the mount substrate 51.

Figure 6:
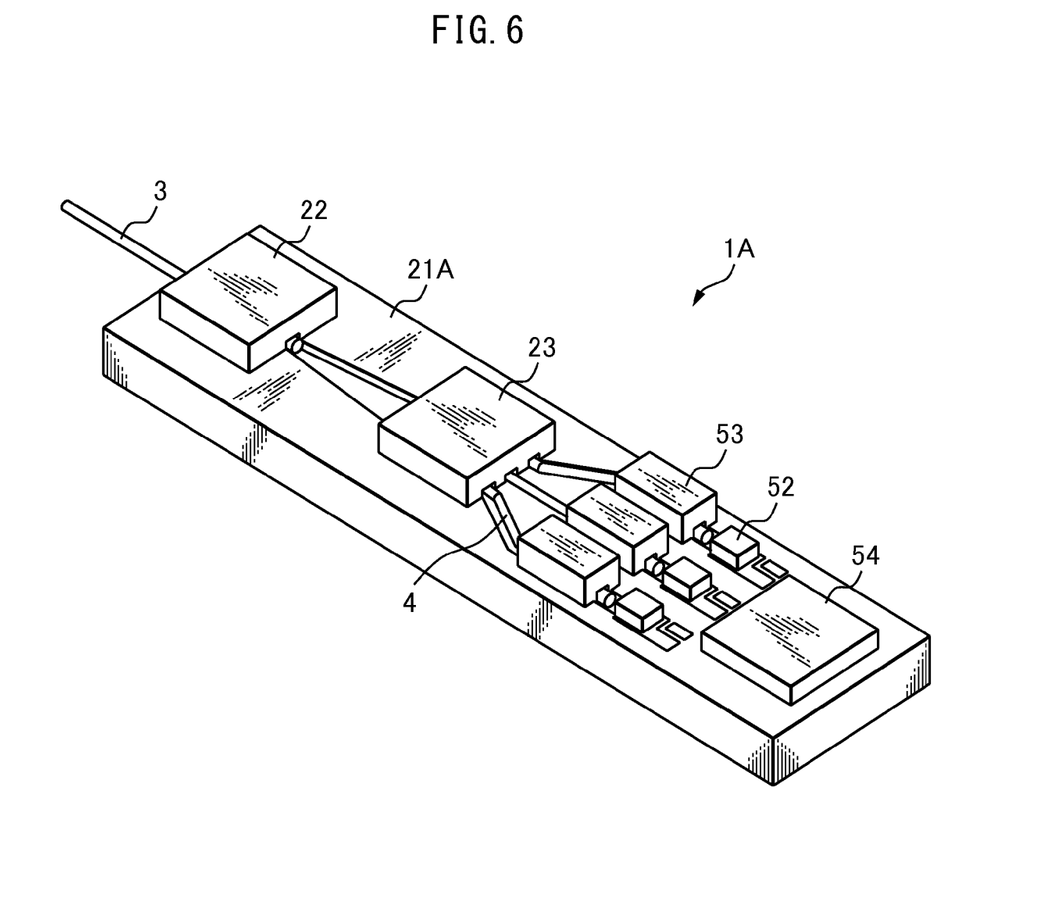
FIG. 6 is a perspective view of an optical module 1A.
Figure 7A:
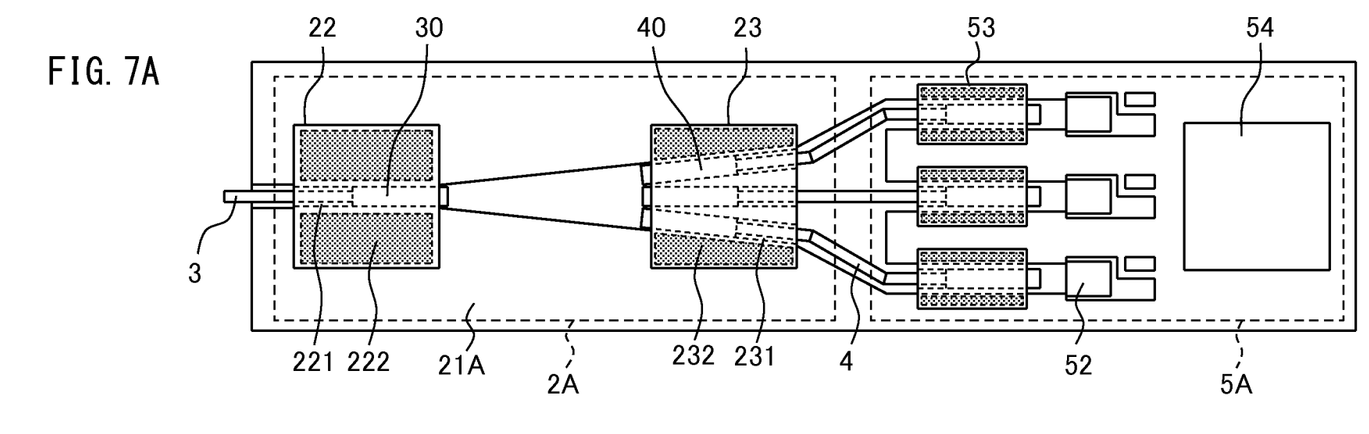
FIGS. 7A and 7B are a top view and a side view of the optical module 1A, respectively.
Figure 7B:
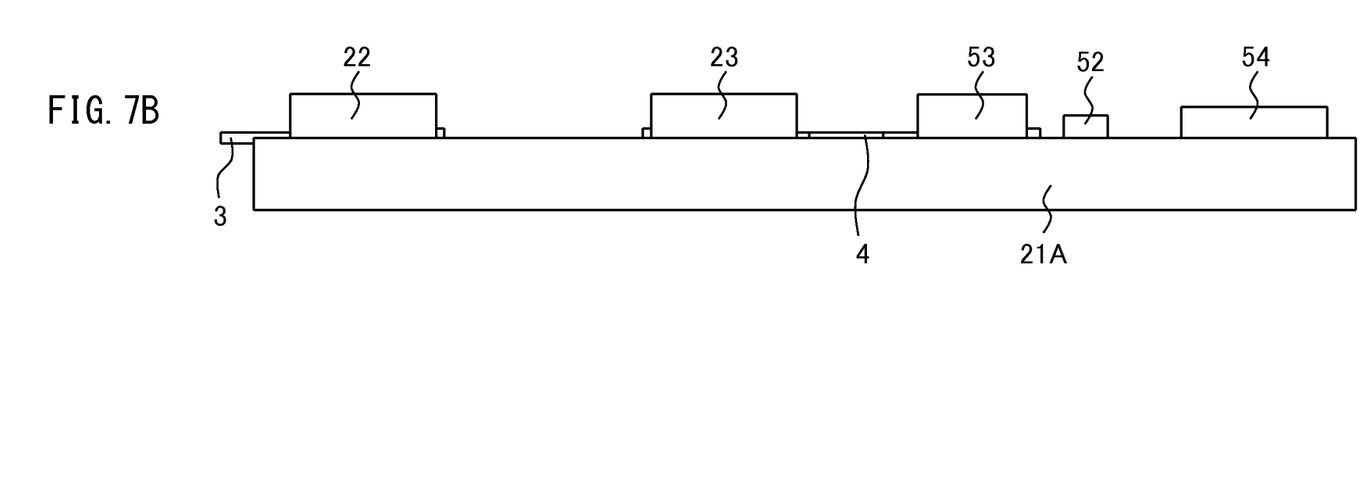

FIG. 6 is a perspective view of an optical module 1A. FIG. 7A and FIG. 7B are a top view and a side view of the optical module 1A, respectively. The optical module 1A is a multicore fiber module having a color combiner 2A and a light source unit 5A loaded on the same substrate.

Since the configuration of the optical module 1A is similar to the configuration of the optical module 1, except that a mount substrate 21A is formed by integrating the mount substrate 21 and the mount substrate 51 of the optical module 1, redundant description will be omitted. The mount substrate 21A is a substrate made of silicon, similar to the mount substrates 21, 51, and is a common Si platform in the optical module 1A. In this manner, the color combiner and the light source unit may be integrally loaded as one piece on the same Si platform.

Figure 8:
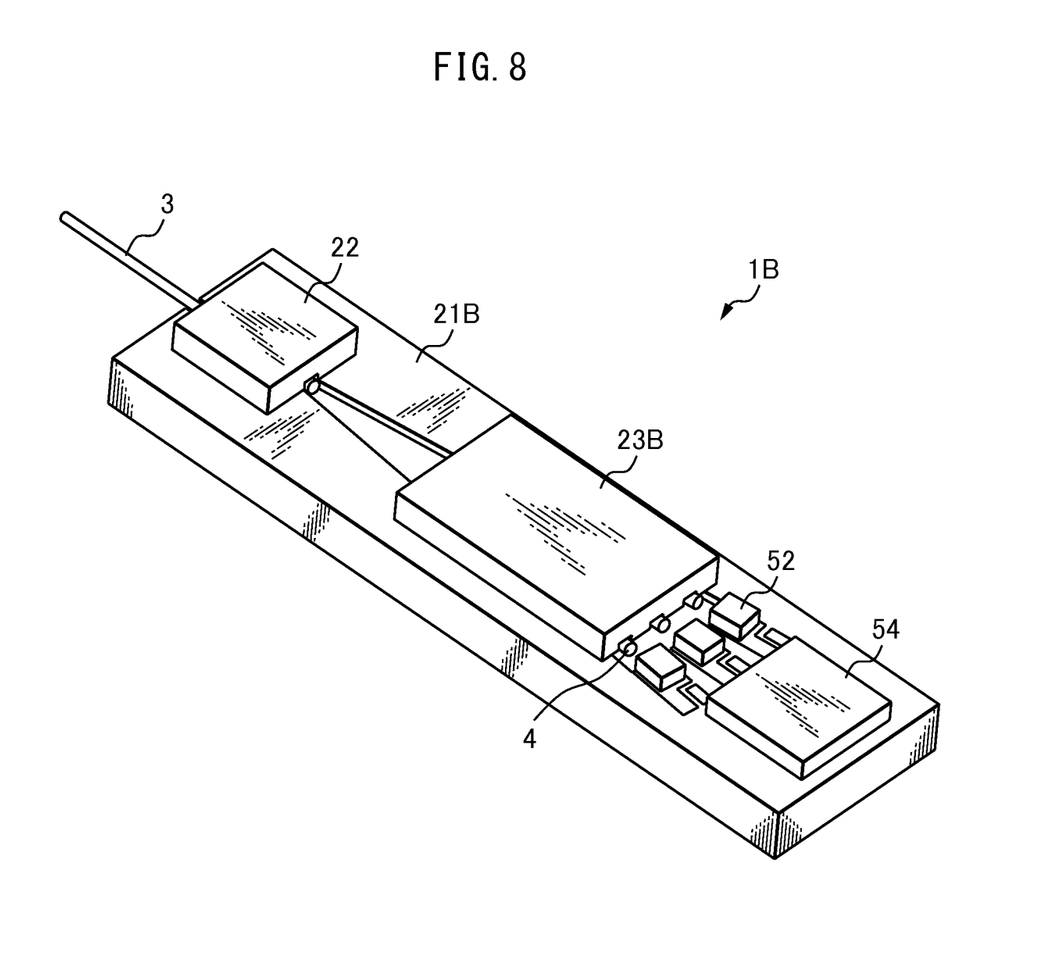
FIG. 8 is a perspective view of an optical module 1B.
Figure 9A:
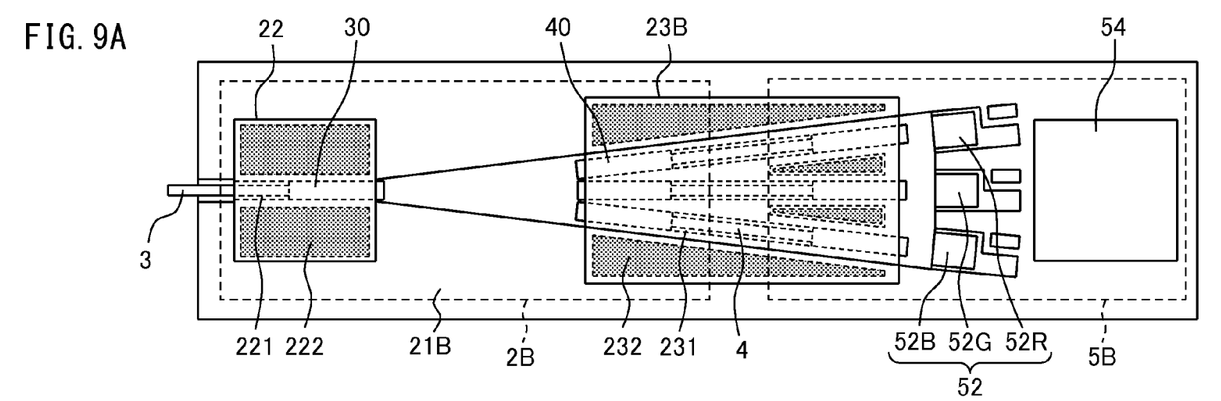
FIGS. 9A to 9C are a top view and a side view of the optical module 1B, and a rear view of a sub-substrate 23B, respectively.
Figure 9B:
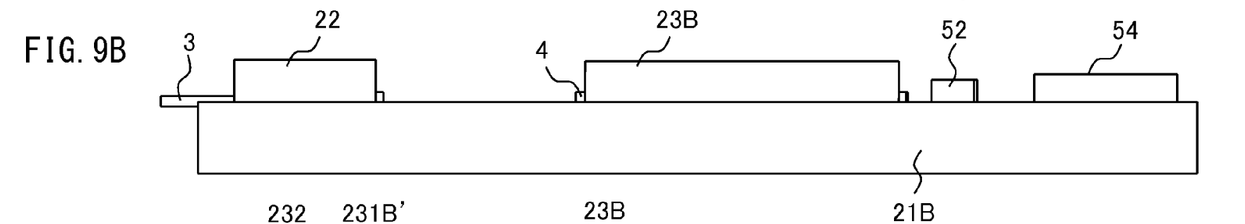
Figure 9C:
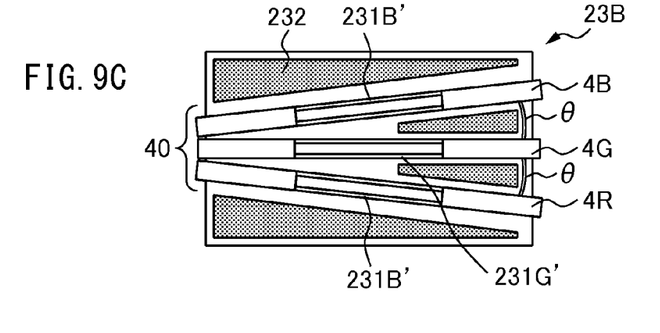

FIG. 8 is a perspective view of an optical module 1B. FIG. 9A to FIG. 9C are a top view and a side view of the optical module 1B, and a rear view of a sub-substrate 23B, respectively. The optical module 1B is also a multicore fiber module having a color combiner 2B and a light source unit 5B loaded on the same substrate, similar to the optical module 1A.

The configuration of the optical module 1B is also similar to the configuration of the optical module 1, and therefore only parts different from those of the optical module 1 will be described below. First, also in the optical module 1B, a mount substrate 21B is formed by integrating the mount substrates 21, 51 of the optical module 1, similar to the optical module 1A. The mount substrate 21B is a substrate made of silicon similar to the mount substrates 21, 51, and is a common Si platform in the optical module 1B.

In the optical module 1B, the sub-substrate 23B is formed by integrating the sub-substrates 23, 53 of the optical module 1. As illustrated in FIG. 9C, in the sub-substrate 23B, three grooves 231R', 231G', 231B' are formed that are close to the central at one end, and form angles between each of the adjacent grooves which satisfies $\theta=6°$, similar to the sub-substrate 23. In the optical module 1B, the incident end parts of the respective single-mode fibers 4 are arranged at angles between each of the adjacent fibers which satisfies $\theta=6°$, in the light source unit 5B as well, by these grooves. For this reason, in the optical module 1B, the laser elements 52R, 52B at both ends are arranged obliquely relative to the laser element 52G in the center, corresponding to the installation angles of the respective single-mode fibers 4.

In the case of the optical module 1B, alignment between the laser elements 52 and the single-mode fibers 4 is performed concurrently for the three light sources. For example, similar to the case of the optical module 1, the positions in the x-, y-directions of the respective laser elements 52 are adjusted, so that the optical coupling efficiency between the single-mode fibers 4 and the corresponding laser elements 52 becomes maximum when the position of the sub-substrate 23B relative to the sub-substrate 22 is determined. Then, at the respectively determined positions, the sub-substrates 22, 23B and the respective laser elements 52 are bonded by surface-activated bonding on the mount substrate 21B. Also in this case, in order to facilitate the core alignment, it is desirable to connect GI lenses for convergence at the end faces of the single-mode fibers 4, and provide space between the laser elements 5.

In the color combiners 2, 2A, 2B described above, by configuring them as the Si-platform-type device, points that require core alignment will be fewer than an optical fiber connector by a space optical system using, for example, a plurality of lenses. As a result, the core alignment process is simplified. Further, there is provided a multiplexer of RGB laser lights miniaturized relative to conventional one, by the color combiners 2, 2A, 2B. The optical modules 1, 1A, 1B using the color combiners 2, 2A, 2B are applicable as a light source for a laser projector, a fiber scanner, etc.

In any of the optical modules 1, 1A, 1B described above, the light source unit 5 is arranged on the side of the single-mode fibers 4, but if a multi-emitter-type laser element, for example, having light emission points corresponding to multicores is used for the light source, the light source unit may be provided on the side of the multicore fiber 3. In other words, in the color combiners 2, 2A, 2B, the incident side and emitting side may be reversed between the multicore fiber 3 and the single-mode fibers 4.

Alternatively, the number of the single-mode fibers is not limited to three, and any number may be used. For example, fibers that guide the respective color laser beams of RGB may be multiplexed for each color, or fibers may exist that guide lights having other wavelengths such as infrared rays in addition to fibers for RGB. Alternatively, lights having the same wavelength (the same color) may be guided by a plurality of single-mode fibers. The number of the single-mode fibers may be different from a total number of cores arrayed in the same plane of the multicore fiber, and as for the multicore fiber, only a part of a plurality of cores arrayed in the same plane may be used. Also in these cases, a plurality of cores in the same plane of the multicore fiber to be used for optical coupling and the single-mode fibers the number of which corresponds to these cores can be arrayed and fixed in respective rows by two sub-substrates, and both can be optically coupled in the same manner.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An optical fiber connector comprising:
    a mount substrate;
    a multicore fiber including a plurality of cores arrayed in the same plane;
    a first sub-substrate configured to fix an end part of the multicore fiber between the first sub-substrate and the mount substrate, and to be bonded on the mount substrate;
    a plurality of single-mode fibers including at least the same number of fibers as the plurality of cores of the multicore fiber; and
    a second sub-substrate configured to fix end parts of the plurality of single-mode fibers between the second sub-substrate and the mount substrate, and to be bonded on the mount substrate,
    wherein a relative position between the first sub-substrate and the second sub-substrate is determined, so that the plurality of cores of the multicore fiber and the plurality of single-mode fibers of the same number as the plurality of cores are optically coupled, respectively.

2. The optical fiber connector according to claim 1, wherein gradient index lenses are respectively provided at the end part of the multicore fiber and at the end parts of the plurality of single-mode fiber.

3. The optical fiber connector according to claim 1, wherein the second sub-substrate fixes the end parts of the plurality of single-mode fibers, so that end parts of two adjacent single-mode fibers form an angle corresponding to a spread angle of a plurality of beams emitted from the plurality of cores of the multicore fiber.

4. The optical fiber connector according to claim 1, wherein
    the plurality of single-mode fibers are three single-mode fibers that guide red, green and blue laser light, respectively, and
    the plurality of cores of the multicore fiber are three cores which guide the red, green and blue laser light, respectively.

5. The optical fiber connector according to claim 1, wherein the first sub-substrate fixes the end part of the multicore fiber, so that the plurality of cores is arrayed in parallel to a top surface of the mount substrate.

6. An optical module comprising:
    a mount substrate;
    a multicore fiber including a plurality of cores arrayed in the same plane;
    a first sub-substrate configured to fix an end part of the multicore fiber, and to be bonded on the mount substrate;
    a plurality of single-mode fibers including at least the same number of fibers as the plurality of cores of the multicore fiber;
    a second sub-substrate configured to fix end parts of the plurality of single-mode fibers, and to be bonded on the mount substrate; and
    a light source unit configured to emit red, green and blue laser light guided by the multicore fiber and the plurality of single-mode fibers,
    wherein a relative position between the first sub-substrate and the second sub-substrate is determined, so that the plurality of cores of the multicore fiber and the plurality of single-mode fibers of the same number as the plurality of cores are optically coupled, respectively.

7. A method for fabricating an optical fiber connector, comprising the steps of:
    fixing to a first sub-substrate an end part of a multicore fiber including a plurality of cores arrayed in the same plane;
    fixing to a second sub-substrate end parts of a plurality of single-mode fibers including at least the same number of fibers as the plurality of cores of the multicore fiber;
    arranging the first sub-substrate and the second sub-substrate on a mount substrate such that the multicore fiber and the plurality of single-mode fibers are secured between the first and second sub-substrates and the mount substrate, respectively;
    determining a relative position between the first sub-substrate and the second sub-substrate, so that the plurality of cores of the multicore fiber and the plurality of single-mode fibers of the same number as the plurality of cores are optically coupled, respectively; and
    bonding on the mount substrate, the first sub-substrate and the second sub-substrate, the relative position of which is determined.

8. The method according to claim 7, wherein the relative position of the first sub-substrate and the second sub-substrate is determined based on an optical coupling efficiency between one fiber of the plurality of single-mode fibers and a core of the multicore fiber corresponding to the one fiber.

* * * * *